(12) United States Patent
Ronen

(10) Patent No.: US 11,526,003 B2
(45) Date of Patent: Dec. 13, 2022

(54) OPTICAL SYSTEM INCLUDING LIGHT-GUIDE OPTICAL ELEMENT WITH PARTIALLY-REFLECTIVE INTERNAL SURFACES

(71) Applicant: Lumus Ltd., Ness Ziona (IL)

(72) Inventor: Eitan Ronen, Rechovot (IL)

(73) Assignee: LUMUS LTD., Ness Ziona (IL)

(*) Notice: Subject to any disclaimer, the term of this patent is extended or adjusted under 35 U.S.C. 154(b) by 255 days.

(21) Appl. No.: 16/980,527

(22) PCT Filed: May 23, 2019

(86) PCT No.: PCT/IB2019/054272
§ 371 (c)(1),
(2) Date: Sep. 14, 2020

(87) PCT Pub. No.: WO2019/224764
PCT Pub. Date: Nov. 28, 2019

(65) Prior Publication Data
US 2021/0063733 A1 Mar. 4, 2021

Related U.S. Application Data

(60) Provisional application No. 62/675,205, filed on May 23, 2018.

(51) Int. Cl.
*G02B 27/00* (2006.01)
*F21V 8/00* (2006.01)
(Continued)

(52) U.S. Cl.
CPC ....... *G02B 27/0081* (2013.01); *G02B 6/0055* (2013.01); *G02B 6/0065* (2013.01);
(Continued)

(58) Field of Classification Search
CPC ............ G02B 27/0081; G02B 27/0101; G02B 6/0055; G02B 6/0066; G02B 6/327; G02B 2027/0123
(Continued)

(56) References Cited

U.S. PATENT DOCUMENTS 2,748,659 A 6/1956 Geffcken et al.
2,795,069 A 6/1957 Hardesty
(Continued)

FOREIGN PATENT DOCUMENTS

CN 200941530 Y 9/2007
CN 101542346 9/2009
(Continued)

OTHER PUBLICATIONS

Jan vad de Kraats et al. "Directional and nondirectional spectral reflection from the human fovea" Journal of Biomedical Optics. 13(2). 024010 (Mar./Apr. 2008).
(Continued)

*Primary Examiner* — Collin X Beatty
(74) *Attorney, Agent, or Firm* — Mark M. Friedman

(57) ABSTRACT

An optical system includes a light-guide optical element (LOE) (100) having a pair of parallel major external surfaces (102, 104) and a set of mutually-parallel reflector surfaces (106a, 106b, 106c) obliquely angled within the LOE. At least one of the reflector surfaces has high reflectivity for angles of incidence above 60 degrees to the normal and partial reflectivity for angles of incidence less than 35 degrees to the normal.

9 Claims, 4 Drawing Sheets

(51) Int. Cl.
  *G02B 6/32* (2006.01)
  *G02B 27/01* (2006.01)
(52) U.S. Cl.
  CPC ......... *G02B 6/327* (2013.01); *G02B 27/0101* (2013.01); *G02B 2027/0123* (2013.01)
(58) Field of Classification Search
  USPC ...................................................... 359/633
  See application file for complete search history.

(56) References Cited

U.S. PATENT DOCUMENTS

| | | |
|---|---|---|
| 2,886,911 A | 5/1959 | Hardesty |
| 3,491,245 A | 1/1970 | Hardesty |
| 3,626,394 A | 12/1971 | Nelson et al. |
| 3,667,621 A | 6/1972 | Barlow |
| 3,677,621 A | 7/1972 | Smith |
| 3,737,212 A | 6/1973 | Antonson et al. |
| 3,802,763 A | 4/1974 | Cook et al. |
| 3,829,197 A | 8/1974 | Thelen |
| 3,857,109 A | 12/1974 | Pilloff |
| 3,873,209 A | 3/1975 | Schinke |
| 3,940,204 A | 2/1976 | Withrington |
| 3,969,023 A | 7/1976 | Brandt |
| 4,084,883 A | 4/1978 | Eastman et al. |
| 4,191,446 A | 3/1980 | Arditty et al. |
| 4,309,070 A | 1/1982 | St Leger Searle |
| 4,331,387 A | 5/1982 | Wentz |
| 4,355,864 A | 10/1982 | Soref |
| 4,516,828 A | 5/1985 | Steele |
| 4,613,216 A | 9/1986 | Herbec et al. |
| 4,711,512 A | 12/1987 | Upatnieks |
| 4,715,684 A | 12/1987 | Gagnon |
| 4,775,217 A | 10/1988 | Ellis |
| 4,798,448 A | 1/1989 | Van Raalte |
| 4,805,988 A | 2/1989 | Dones |
| 4,932,743 A | 6/1990 | Isobe et al. |
| 4,978,952 A | 12/1990 | Irwin |
| 5,033,828 A | 7/1991 | Haruta |
| 5,076,664 A | 12/1991 | Migozzi |
| 5,096,520 A | 3/1992 | Faris |
| 5,157,526 A | 10/1992 | Kondo et al. |
| 5,208,800 A | 5/1993 | Isobe et al. |
| 5,231,642 A | 7/1993 | Scifres et al. |
| 5,235,589 A | 8/1993 | Yokomori et al. |
| 5,301,067 A | 4/1994 | Bleier et al. |
| 5,353,134 A | 10/1994 | Michel et al. |
| 5,367,399 A | 11/1994 | Kramer |
| 5,369,415 A | 11/1994 | Richard et al. |
| 5,453,877 A | 9/1995 | Gerbe et al. |
| 5,543,877 A | 8/1996 | Takashi et al. |
| 5,555,329 A | 9/1996 | Kuper et al. |
| 5,619,601 A | 4/1997 | Akashi et al. |
| 5,650,873 A | 7/1997 | Gal et al. |
| 5,680,209 A | 10/1997 | Maechler |
| 5,712,694 A | 1/1998 | Taira et al. |
| 5,724,163 A | 3/1998 | David |
| 5,751,480 A | 5/1998 | Kitagishi |
| 5,764,412 A | 6/1998 | Suzuki et al. |
| 5,829,854 A | 11/1998 | Jones |
| 5,883,684 A | 3/1999 | Millikan et al. |
| 5,896,232 A | 4/1999 | Budd et al. |
| 5,919,601 A | 7/1999 | Nguyen et al. |
| 5,966,223 A | 10/1999 | Amitai et al. |
| 5,982,536 A | 11/1999 | Swan |
| 6,021,239 A | 2/2000 | Minami et al. |
| 6,052,500 A | 4/2000 | Takano et al. |
| 6,091,548 A | 7/2000 | Chen |
| 6,144,347 A | 11/2000 | Mizoguchi et al. |
| 6,222,676 B1 | 4/2001 | Takayoshi et al. |
| 6,231,992 B1 | 5/2001 | Niebauer et al. |
| 6,239,092 B1 | 5/2001 | Papasso et al. |
| 6,322,256 B1 | 11/2001 | Inada et al. |
| 6,324,330 B1 | 11/2001 | Stites |
| 6,349,001 B1 | 2/2002 | Spitzer |
| 6,362,861 B1 | 3/2002 | Hertz et al. |
| 6,490,087 B1 | 3/2002 | Fulkerson et al. |
| 6,384,982 B1 | 5/2002 | Spitzer |
| 6,388,814 B2 | 5/2002 | Tanaka |
| 6,404,550 B1 | 6/2002 | Yajima |
| 6,404,947 B1 | 6/2002 | Matsuda |
| 6,440,550 B1 | 8/2002 | Hacker |
| 6,490,104 B1 | 12/2002 | Gleckman et al. |
| 6,509,982 B2 | 1/2003 | Steiner |
| 6,542,307 B2 | 4/2003 | Gleckman |
| 6,556,282 B2 | 4/2003 | Jamieson et al. |
| 6,577,411 B1 | 6/2003 | David |
| 6,580,529 B1 | 6/2003 | Amitai et al. |
| 6,592,224 B2 | 7/2003 | Ito et al. |
| 6,611,385 B2 | 8/2003 | Song |
| 6,671,100 B1 | 12/2003 | McRuer |
| 6,690,513 B2 | 2/2004 | Hulse et al. |
| 6,710,902 B2 | 3/2004 | Takeyama |
| 6,775,432 B2 | 8/2004 | Basu |
| 6,791,760 B2 | 9/2004 | Janeczko et al. |
| 6,798,579 B2 | 9/2004 | Robinson et al. |
| 6,829,095 B2 | 12/2004 | Amitai |
| 6,880,931 B2 | 4/2005 | Moliton et al. |
| 6,942,925 B1 | 9/2005 | Lazarev et al. |
| 7,016,113 B2 | 3/2006 | Choi et al. |
| 7,021,777 B2 | 4/2006 | Amitai |
| 7,088,664 B2 | 8/2006 | Kim et al. |
| 7,175,304 B2 | 2/2007 | Wadia et al. |
| 7,205,960 B2 | 4/2007 | David |
| 7,355,795 B1 | 4/2008 | Yamazaki et al. |
| 7,391,573 B2 | 6/2008 | Amitai |
| 7,418,170 B2 | 8/2008 | Mukawa et al. |
| 7,430,355 B2 | 9/2008 | Heikenfeld et al. |
| 7,448,170 B2 | 11/2008 | Milovan et al. |
| 7,724,441 B2 | 5/2010 | Amitai |
| 7,751,122 B2 | 7/2010 | Amitai |
| 7,778,508 B2 | 8/2010 | Hirayama |
| 7,949,214 B2 | 5/2011 | Dejong |
| 7,995,275 B2 | 8/2011 | Maeda et al. |
| 8,004,765 B2 | 8/2011 | Amitai |
| 8,035,872 B2 | 10/2011 | Ouchi |
| 8,187,481 B1 | 5/2012 | Hobbs |
| 8,369,019 B2 | 2/2013 | Baker |
| 8,655,178 B2 | 2/2014 | Capron et al. |
| 8,665,178 B1 | 3/2014 | Wang |
| 8,666,208 B1 | 3/2014 | Amirparviz et al. |
| 8,718,437 B2 | 5/2014 | Coe-Sullivan |
| 8,736,963 B2 | 5/2014 | Robbins et al. |
| 8,743,464 B1 | 6/2014 | Amirparviz |
| 8,913,865 B1 | 12/2014 | Bennett |
| 8,965,152 B2 | 2/2015 | Simmonds |
| 9,039,906 B2 | 5/2015 | Schulz et al. |
| 9,248,616 B2 | 2/2016 | Amitai |
| 9,523,852 B1 | 12/2016 | Brown et al. |
| 9,541,762 B2 | 1/2017 | Mukawa et al. |
| 9,551,880 B2 | 1/2017 | Amitai |
| 9,568,738 B2 | 2/2017 | Mansharof et al. |
| 9,709,809 B2 | 7/2017 | Miyawaki et al. |
| 9,804,396 B2 | 10/2017 | Yaakov |
| 9,805,633 B2 | 10/2017 | Zheng |
| 9,933,684 B2 | 4/2018 | Brown et al. |
| 9,946,069 B2 | 4/2018 | Valera et al. |
| 10,048,499 B2 | 8/2018 | Amitai |
| 10,222,535 B2 | 3/2019 | Remhof et al. |
| 10,302,957 B2 | 5/2019 | Sissom |
| 10,466,479 B2 | 11/2019 | Shih et al. |
| 2001/0030860 A1 | 10/2001 | Kimura et al. |
| 2002/0015233 A1 | 2/2002 | Park |
| 2002/0176173 A1 | 11/2002 | Song |
| 2002/0191297 A1 | 12/2002 | Gleckman et al. |
| 2003/0007157 A1 | 1/2003 | Hulse et al. |
| 2003/0020006 A1 | 1/2003 | Janeczko et al. |
| 2003/0063042 A1 | 4/2003 | Friesem et al. |
| 2003/0072160 A1 | 4/2003 | Kuepper et al. |
| 2003/0090439 A1 | 5/2003 | Spitzer et al. |
| 2003/0165017 A1 | 9/2003 | Amitai |
| 2003/0197938 A1 | 10/2003 | Schmidt et al. |
| 2003/0218718 A1 | 11/2003 | Moliton et al. |
| 2004/0032660 A1 | 2/2004 | Amitai |

(56) References Cited

U.S. PATENT DOCUMENTS

| | | |
|---|---|---|
| 2004/0033528 A1 | 2/2004 | Amitai |
| 2004/0085649 A1 | 5/2004 | Repetto et al. |
| 2004/0137189 A1 | 7/2004 | Tellini et al. |
| 2004/0233534 A1 | 11/2004 | Nakanishi et al. |
| 2005/0018308 A1 | 1/2005 | Cassarly et al. |
| 2005/0024849 A1 | 2/2005 | Parker et al. |
| 2005/0078388 A1 | 4/2005 | Amitai |
| 2005/0083592 A1 | 4/2005 | Amitai |
| 2005/0084210 A1 | 4/2005 | Cha |
| 2005/0174641 A1 | 8/2005 | Greenberg |
| 2005/0174658 A1 | 8/2005 | Long et al. |
| 2005/0180687 A1 | 8/2005 | Amitai |
| 2005/0265044 A1 | 12/2005 | Chen et al. |
| 2006/0126182 A1 | 6/2006 | Levola |
| 2006/0268421 A1 | 11/2006 | Shimizu et al. |
| 2007/0015967 A1 | 1/2007 | Freeman et al. |
| 2007/0070859 A1 | 3/2007 | Hlrayama |
| 2007/0091445 A1 | 4/2007 | Amitai |
| 2007/0097513 A1 | 5/2007 | Amitai |
| 2007/0155277 A1 | 7/2007 | Amitai |
| 2007/0165192 A1 | 7/2007 | Prior |
| 2007/0188837 A1 | 8/2007 | Shimizu et al. |
| 2008/0025667 A1 | 1/2008 | Amitai |
| 2008/0094586 A1 | 4/2008 | Hirayama |
| 2008/0106775 A1 | 5/2008 | Amitai et al. |
| 2008/0151375 A1 | 6/2008 | Lin |
| 2008/0151379 A1 | 6/2008 | Amitai |
| 2008/0186604 A1 | 8/2008 | Amitai |
| 2008/0192239 A1 | 8/2008 | Otosaka |
| 2008/0198471 A1 | 8/2008 | Amitai |
| 2008/0247150 A1 | 10/2008 | Itoh et al. |
| 2008/0278812 A1 | 11/2008 | Amitai |
| 2008/0285140 A1 | 11/2008 | Amitai |
| 2009/0010023 A1 | 1/2009 | Kanade et al. |
| 2009/0052046 A1 | 2/2009 | Amitai |
| 2009/0052047 A1 | 2/2009 | Amitai |
| 2009/0097127 A1 | 4/2009 | Amitai |
| 2009/0122414 A1 | 5/2009 | Amitai |
| 2009/0153437 A1 | 6/2009 | Aharoni |
| 2009/0190222 A1 | 7/2009 | Simmonds et al. |
| 2009/0251788 A1 | 10/2009 | Dejong et al. |
| 2010/0027289 A1 | 2/2010 | Aiki et al. |
| 2010/0053148 A1 | 3/2010 | Khazeni et al. |
| 2010/0111472 A1 | 5/2010 | DeJong |
| 2010/0171680 A1 | 7/2010 | Lapidot et al. |
| 2010/0202128 A1 | 8/2010 | Saccomanno |
| 2010/0214635 A1 | 8/2010 | Sasaki et al. |
| 2010/0278480 A1 | 11/2010 | Vasylyev et al. |
| 2010/0291489 A1 | 11/2010 | Moskovits et al. |
| 2011/0019250 A1 | 1/2011 | Aiki et al. |
| 2011/0096566 A1 | 4/2011 | Tsai et al. |
| 2011/0176218 A1 | 7/2011 | Noui |
| 2011/0227661 A1 | 9/2011 | Numata et al. |
| 2011/0242661 A1 | 10/2011 | Simmonds |
| 2012/0039576 A1 | 2/2012 | Dangel et al. |
| 2012/0062998 A1 | 3/2012 | Schultz et al. |
| 2012/0147361 A1 | 6/2012 | Mochizuki et al. |
| 2012/0179369 A1 | 6/2012 | Lapidot et al. |
| 2012/0194781 A1 | 8/2012 | Agurok |
| 2012/0306940 A1 | 12/2012 | Machida |
| 2013/0016292 A1 | 1/2013 | Miao et al. |
| 2013/0022316 A1 | 1/2013 | Pelletier et al. |
| 2013/0070344 A1 | 3/2013 | Takeda et al. |
| 2013/0135749 A1 | 5/2013 | Akutsu et al. |
| 2013/0229717 A1 | 9/2013 | Amitai |
| 2013/0242392 A1 | 9/2013 | Amirparviz et al. |
| 2013/0250430 A1 | 9/2013 | Robbuns et al. |
| 2013/0276960 A1 | 10/2013 | Amitai |
| 2013/0279017 A1 | 10/2013 | Amitai |
| 2013/0321432 A1 | 12/2013 | Burns et al. |
| 2013/0334504 A1 | 12/2013 | Thompson et al. |
| 2014/0003762 A1 | 1/2014 | Macnamara |
| 2014/0043688 A1 | 2/2014 | Schrader et al. |
| 2014/0118813 A1 | 5/2014 | Amitai et al. |
| 2014/0118836 A1 | 5/2014 | Amitai et al. |
| 2014/0118837 A1 | 5/2014 | Amitai et al. |
| 2014/0126051 A1 | 5/2014 | Amitai et al. |
| 2014/0126052 A1 | 5/2014 | Amitai et al. |
| 2014/0126056 A1 | 5/2014 | Amitai et al. |
| 2014/0126057 A1 | 5/2014 | Amitai et al. |
| 2014/0126175 A1 | 5/2014 | Amitai et al. |
| 2014/0160577 A1 | 6/2014 | Dominici et al. |
| 2014/0185142 A1 | 7/2014 | Gupta et al. |
| 2014/0226215 A1 | 8/2014 | Komatsu et al. |
| 2014/0226361 A1 | 8/2014 | Vasylyev |
| 2014/0311570 A1 | 10/2014 | Raymond |
| 2014/0334777 A1 | 11/2014 | Dubroca et al. |
| 2015/0003796 A1 | 1/2015 | Bennett |
| 2015/0016777 A1 | 1/2015 | Abovitz et al. |
| 2015/0081313 A1 | 3/2015 | Boross et al. |
| 2015/0138451 A1 | 5/2015 | Amitai |
| 2015/0138646 A1 | 5/2015 | Tatsugi |
| 2015/0153569 A1 | 6/2015 | Yonekubo |
| 2015/0160529 A1 | 6/2015 | Popovich et al. |
| 2015/0182348 A1 | 7/2015 | Siegal et al. |
| 2015/0198805 A1 | 7/2015 | Mansharof et al. |
| 2015/0205140 A1 | 7/2015 | Mansharof et al. |
| 2015/0205141 A1 | 7/2015 | Mansharof et al. |
| 2015/0219834 A1 | 8/2015 | Nichol et al. |
| 2015/0235473 A1 | 8/2015 | Schowengerdt |
| 2015/0241619 A1 | 8/2015 | Richards et al. |
| 2015/0277127 A1 | 10/2015 | Amitai |
| 2015/0309316 A1 | 10/2015 | Osterhout et al. |
| 2015/0338655 A1 | 11/2015 | Sawada et al. |
| 2015/0293360 A1 | 12/2015 | Amitai |
| 2016/0116743 A1 | 4/2016 | Amitai |
| 2016/0170212 A1 | 6/2016 | Amitai |
| 2016/0170213 A1 | 6/2016 | Amitai |
| 2016/0170214 A1 | 6/2016 | Amitai |
| 2016/0187656 A1 | 6/2016 | Amitai |
| 2016/0024731 A1 | 8/2016 | Nowatzyk et al. |
| 2016/0234485 A1 | 8/2016 | Robbins et al. |
| 2016/0238844 A1 | 8/2016 | Dobschal |
| 2016/0313567 A1 | 10/2016 | Kurashige |
| 2016/0314564 A1 | 10/2016 | Jones |
| 2016/0341964 A1 | 11/2016 | Amitai |
| 2016/0349518 A1 | 12/2016 | Amitai et al. |
| 2016/0370693 A1 | 12/2016 | Watanabe |
| 2017/0003504 A1 | 1/2017 | Vallius et al. |
| 2017/0045743 A1 | 2/2017 | Dobschal et al. |
| 2017/0045744 A1 | 2/2017 | Amitai |
| 2017/0052376 A1 | 2/2017 | Amitai |
| 2017/0052377 A1 | 2/2017 | Amitai |
| 2017/0075119 A1 | 3/2017 | Schultz et al. |
| 2017/0122725 A1 | 5/2017 | Yeoh |
| 2017/0242249 A1 | 8/2017 | Wall |
| 2017/0276947 A1 | 9/2017 | Yokoyama |
| 2017/0285349 A1 | 10/2017 | Ayres et al. |
| 2017/0299871 A1 | 10/2017 | Totani et al. |
| 2017/0299891 A1 | 10/2017 | Odaira et al. |
| 2017/0336636 A1 | 11/2017 | Amitai et al. |
| 2017/0343822 A1 | 11/2017 | Border et al. |
| 2017/0357095 A1 | 12/2017 | Amitai |
| 2017/0363799 A1 | 12/2017 | Ofir et al. |
| 2018/0039082 A1 | 2/2018 | Amitai |
| 2018/0067315 A1 | 3/2018 | Amitai et al. |
| 2018/0088337 A1 | 3/2018 | Yoshida et al. |
| 2018/0157057 A1 | 6/2018 | Gelberg et al. |
| 2018/0210202 A1 | 7/2018 | Danziger |
| 2018/0267317 A1 | 9/2018 | Amitai |
| 2018/0275384 A1 | 9/2018 | Danziger et al. |
| 2018/0284448 A1 | 10/2018 | Matsuki et al. |
| 2018/0292592 A1 | 10/2018 | Danziger |
| 2018/0292599 A1 | 10/2018 | Ofir et al. |
| 2018/0373039 A1 | 12/2018 | Amitai |
| 2019/0011710 A1 | 1/2019 | Amitai |
| 2019/0056600 A1 | 2/2019 | Danziger et al. |
| 2019/0064518 A1 | 2/2019 | Danziger |
| 2019/0155035 A1 | 5/2019 | Amitai |
| 2019/0170327 A1 | 6/2019 | Eisenfeld et al. |
| 2019/0208187 A1 | 7/2019 | Danziger |
| 2019/0212487 A1 | 7/2019 | Danziger et al. |
| 2019/0227215 A1 | 7/2019 | Danziger et al. |
| 2019/0278086 A1 | 9/2019 | Ofir |

(56) References Cited

U.S. PATENT DOCUMENTS

| | | |
|---|---|---|
| 2019/0285900 A1 | 9/2019 | Amitai |
| 2019/0293856 A1 | 9/2019 | Danziger |
| 2019/0339530 A1 | 11/2019 | Amitai |
| 2019/0346609 A1 | 11/2019 | Eisenfeld |
| 2019/0361240 A1 | 11/2019 | Gelberg |
| 2019/0361241 A1 | 11/2019 | Amitai |
| 2019/0377187 A1 | 12/2019 | Rubin et al. |
| 2019/0391408 A1 | 12/2019 | Mansharof |
| 2020/0033572 A1 | 1/2020 | Danziger et al. |
| 2020/0041713 A1 | 2/2020 | Danziger |
| 2020/0089001 A1 | 3/2020 | Amitai et al. |
| 2020/0110211 A1 | 4/2020 | Danziger et al. |
| 2020/0120329 A1 | 4/2020 | Danziger |
| 2020/0133008 A1 | 4/2020 | Amitai |
| 2020/0150330 A1 | 5/2020 | Danziger et al. |
| 2020/0183159 A1 | 6/2020 | Danziger |
| 2020/0183170 A1 | 6/2020 | Amitai et al. |
| 2020/0200963 A1 | 6/2020 | Eisenfeld et al. |
| 2020/0209667 A1 | 7/2020 | Sharlin et al. |
| 2020/0241308 A1 | 7/2020 | Danziger et al. |
| 2020/0249481 A1 | 8/2020 | Danziger et al. |
| 2020/0278557 A1 | 9/2020 | Greenstein et al. |
| 2020/0285060 A1 | 9/2020 | Amitai |
| 2020/0292417 A1 | 9/2020 | Lobachinsky et al. |
| 2020/0292744 A1 | 9/2020 | Danziger |
| 2020/0292819 A1 | 9/2020 | Danziger et al. |
| 2020/0310024 A1 | 10/2020 | Danziger et al. |
| 2020/0326545 A1 | 10/2020 | Amitai |
| 2020/0371311 A1 | 11/2020 | Lobachinsky et al. |
| 2021/0003849 A1 | 1/2021 | Amitai et al. |
| 2021/0018755 A1 | 1/2021 | Amitai |
| 2021/0033773 A1 | 2/2021 | Danziger et al. |
| 2021/0033862 A1 | 2/2021 | Danziger et al. |
| 2021/0033872 A1 | 2/2021 | Rubin et al. |
| 2021/0055218 A1 | 2/2021 | Aldaag et al. |
| 2021/0055466 A1 | 2/2021 | Eisenfeld |
| 2021/0055561 A1 | 2/2021 | Danziger et al. |
| 2021/0063733 A1 | 3/2021 | Ronen |
| 2021/0072553 A1 | 3/2021 | Danziger et al. |
| 2021/0099691 A1 | 4/2021 | Danziger |
| 2021/0109351 A1 | 4/2021 | Danziger et al. |
| 2021/0116367 A1 | 4/2021 | Gelberg et al. |
| 2021/0141141 A1 | 5/2021 | Danziger et al. |
| 2021/0157150 A1 | 5/2021 | Amitai |
| 2021/0165231 A1 | 6/2021 | Gelberg et al. |
| 2021/0173480 A1 | 6/2021 | Osterhout et al. |
| 2021/0215941 A1 | 7/2021 | Schultz et al. |
| 2021/0239898 A1 | 8/2021 | Danziger et al. |
| 2021/0271006 A1 | 9/2021 | Ronen et al. |
| 2022/0003914 A1 | 1/2022 | Danziger et al. |
| 2022/0004001 A1 | 1/2022 | Danziger et al. |
| 2022/0004007 A1 | 1/2022 | Bhakta et al. |
| 2022/0004014 A1 | 1/2022 | Ronen et al. |
| 2022/0137274 A1 | 5/2022 | Sharlin et al. |

FOREIGN PATENT DOCUMENTS

| | | |
|---|---|---|
| CN | 101846799 A | 9/2010 |
| CN | 106104569 | 11/2016 |
| CN | 107238928 | 10/2017 |
| DE | 1422172 | 11/1970 |
| DE | 19725262 | 12/1998 |
| DE | 102013106392 | 12/2014 |
| EP | 0365406 | 4/1990 |
| EP | 0380035 | 8/1990 |
| EP | 0399865 | 11/1990 |
| EP | 0543718 | 5/1993 |
| EP | 0566004 | 10/1993 |
| EP | 1158336 | 11/2001 |
| EP | 1180711 | 2/2002 |
| EP | 1326102 | 7/2003 |
| EP | 1385023 | 1/2004 |
| EP | 1485747 | 12/2004 |
| EP | 1562066 | 8/2005 |
| EP | 0770818 | 4/2007 |
| EP | 2530510 | 12/2012 |
| FR | 2496905 | 6/1982 |
| FR | 2638242 | 4/1990 |
| FR | 2721872 | 1/1996 |
| GB | 2220081 | 12/1989 |
| GB | 2272980 | 6/1994 |
| GB | 2278222 | 11/1994 |
| GB | 2278888 | 12/1994 |
| JP | H1994242260 | 3/1996 |
| JP | 2001021448 | 1/2001 |
| JP | 2002539498 | 11/2002 |
| JP | 2003140081 | 5/2003 |
| JP | 2003149643 | 5/2003 |
| JP | 2004527801 | 9/2004 |
| JP | 2005084522 | 3/2005 |
| JP | 2006003872 | 1/2006 |
| JP | 2006145644 | 6/2006 |
| JP | 2010044172 | 2/2010 |
| JP | 2010060770 | 3/2010 |
| JP | 2010170606 | 8/2010 |
| JP | 2011221235 | 11/2011 |
| JP | 2012058404 | 3/2012 |
| JP | 2012163659 | 8/2012 |
| JP | 2013076847 | 4/2013 |
| TW | 201809798 | 3/2018 |
| WO | 9510106 | 4/1995 |
| WO | 9815868 | 4/1998 |
| WO | 1998/058291 | 12/1998 |
| WO | 9952002 | 10/1999 |
| WO | 0004407 | 1/2000 |
| WO | 0063738 | 10/2000 |
| WO | 0127685 | 4/2001 |
| WO | 0195025 | 12/2001 |
| WO | 02082168 | 10/2002 |
| WO | 03058320 | 7/2003 |
| WO | 2004109349 | 12/2004 |
| WO | 2005093493 | 10/2005 |
| WO | 2006085308 | 8/2006 |
| WO | 2006098097 | 9/2006 |
| WO | 2009009268 | 1/2009 |
| WO | 2009074638 | 6/2009 |
| WO | 2011130720 | 10/2011 |
| WO | 2013065656 | 5/2013 |
| WO | 2013188464 | 12/2013 |
| WO | 2015081313 | 6/2015 |
| WO | 2015158828 | 10/2015 |
| WO | 2016132347 | 8/2016 |
| WO | 2017106873 | 6/2017 |
| WO | 2021051068 | 9/2021 |

OTHER PUBLICATIONS

International Commission Non-Ionizing Radiation Protection "ICNIRP Guidelines for Limiting Exosure to Time-Varying Electric, Magnetic and Electromagnetic Fields (Up to 300 GHZ)" Published in: Health Physics 74 (4): 494-522; 1998.

Da-Yong et al., "A Continuous Membrance Micro Deformable Mirror Based on Anodic Bonding of SOI to Glass Water", Microsystem Technologies, Micro and Nanosystems Information Storage and Processing Systems, vol. 16, No. 10, May 20, 2010 pp. 1765-1769.

Da-Yong et al., "A Continuous Membrane Micro Deformable Mirror Based on Anodic Bonding of SOI to Glass Water", Microsystem Technologies, Micro and Nanosystems Information Storage and Processing Systems, Springer, vol. 16, No. IO, May 20, 2010 pp. 1765-1769 (abstract only).

Amotchkina T. et al; "Stress compensation with antireflection coatings for ultrafast laser applications: from theory to practice," Opt. Express 22, 30387-30393 (2014) Amotchkina T. et al. Dec. 31, 2014 (Dec. 31, 2014).

Mori H. et al., "Reflective coatings forthe future x-ray mirror substrates", Proc. SPIE 10699, Space Telescopes and Instrumentation 2018: Ultraviolet to Gamma Ray, 1069941 (Jul. 6, 2018); available at URL <http://doi.org/10.1117/12.2313469> Mori H. et al. Jul. 6, 2018 (Jul. 6, 2018).

(56) References Cited

OTHER PUBLICATIONS

Chalifoux B.D. et al., "Compensating film stress in thin silicon substrates using ion implantation," Opt. Express 27, 11182-11195 (Jan. 21, 2019) Chalifoux B.D. et al. Jan. 21, 2019 (Jan. 21, 2019).

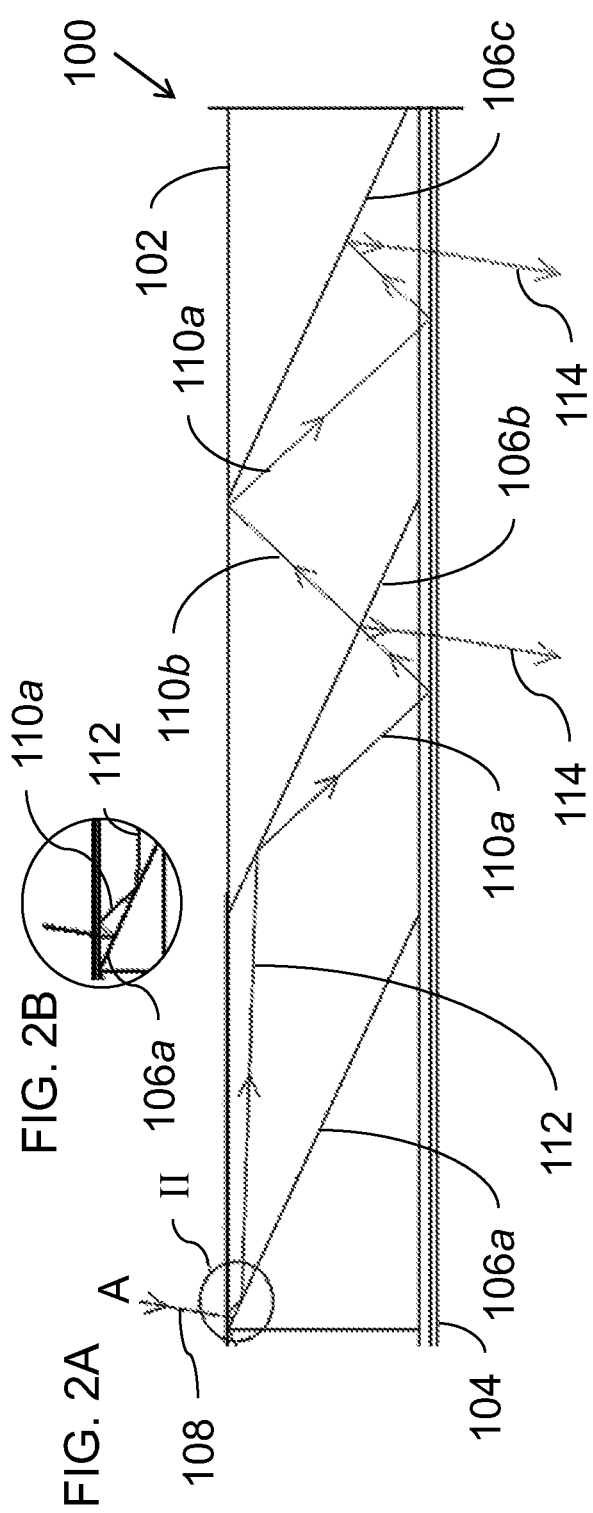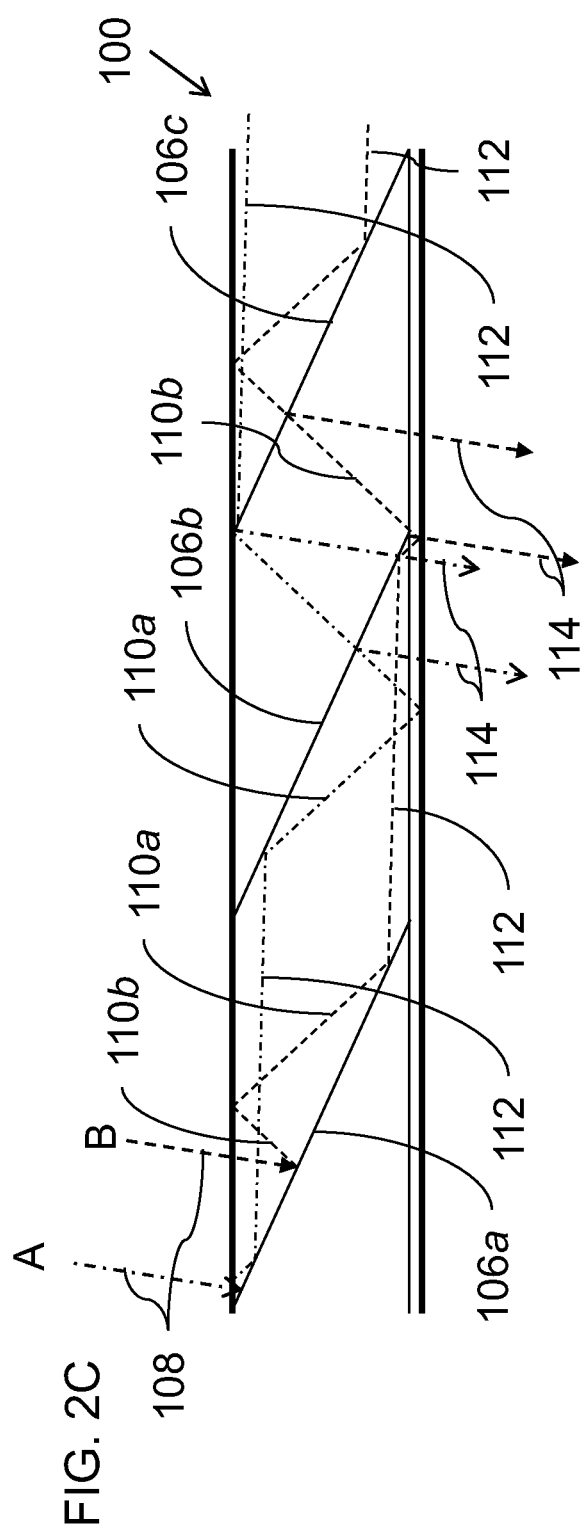

OPTICAL SYSTEM INCLUDING LIGHT-GUIDE OPTICAL ELEMENT WITH PARTIALLY-REFLECTIVE INTERNAL SURFACES

FIELD AND BACKGROUND OF THE INVENTION

The present invention relates to optical systems for use in head-up displays and, in particular, it concerns an optical system employing a light-guide optical element (LOE) with partially-reflective internal surfaces.

Various displays, particularly head-up displays (HUD) and near-eye displays for augmented reality or virtual reality, employ light-guide optical elements (LOEs) having a pair of parallel major external surfaces to convey a collimated image which propagates within the LOE by internal reflection. The image is gradually coupled-out from the LOE, typically either directly towards the eye or into another LOE which conveys the image to the eye. In one class of such devices, coupling-out of the image from the LOE is achieved by a set of mutually-parallel partially-reflecting surfaces within the LOE, deployed obliquely relative to the major external surfaces of the LOE. The gradual coupling-out over a series of partially-reflecting surfaces achieves multiplication of the optical aperture that was coupled into the LOE.

Conventional LOEs impose stringent requirements on reflectivity of the partially-reflecting surfaces as a function of incident angle, typically requiring high transmission (near complete transmission) of image illumination at certain ranges of angles, and partial reflection at other angles relative to the plane of the facets. In practice, it is difficult to achieve near-complete transmission. One typical example is illustrated schematically in FIGS. 1A and 1B in which an LOE 10 with parallel major surfaces 12, 14 includes a set of partially-reflecting surfaces 16 (also referred to interchangeably herein as "facets"). An exemplary ray of light 18, at an angle corresponding to a given pixel of the image generated from a given location in the input optical aperture (not shown), propagates along the LOE by internal reflection at surfaces 12 and 14.

In a typical application, the image illumination exemplified by ray 18 propagates at a steeper angle to the major surfaces 12, 14 than the angle of the partially-reflecting surfaces 16. As a result, each illumination ray 18 may cross a given facet 16 several times. For instance, in FIGS. 1A and 1B, as ray 18 propagates from left to right, it crosses the third facet three times, at locations denoted 1, 2 and 3, respectively. As a result, the light reflected and coupled-out from point 1 (denoted a in FIG. 1B) will be stronger than that reflected and coupled-out from point 3 (denoted b), resulting in a non-uniformity in the output image.

Additionally, it is typically required that the facet be transparent (no reflection) for ray 18 at the angle of incidence shown at location 2, since any reflection there (dotted arrow) will further decrease the brightness of propagating light reaching point 3, and will generate a "ghost" due to illumination propagating in the wrong direction, which may result in part of the image appearing misplaced in the final image. This requirement for full transparency (zero reflection) is difficult to achieve, and becomes increasingly difficult to fulfill as the angles of incidence (AOI) get larger.

SUMMARY OF THE INVENTION

The present invention is an optical system including a light-guide optical element (LOE) with internal reflector surfaces.

According to the teachings of an embodiment of the present invention there is provided, an optical system comprising: (a) a light-guide optical element (LOE) having a pair of parallel major external surfaces; and (b) a plurality of mutually-parallel reflector surfaces within the LOE, the reflector surfaces being obliquely angled relative to the major external surfaces, wherein at least one of the reflector surfaces is configured to have high reflectivity for angles of incidence above 60 degrees to the normal and partial reflectivity for angles of incidence less than 35 degrees to the normal.

According to a further feature of an embodiment of the present invention, the high reflectivity is in excess of 95% for angles of incidence above 60 degrees.

According to a further feature of an embodiment of the present invention, the partial reflectivity is no more than 50%.

According to a further feature of an embodiment of the present invention, the LOE has a coupling-in region from which coupled-in image illumination propagates along the LOE, and wherein the partial reflectivity varies between successive reflector surfaces so as to at least partially compensate for a decreasing intensity of the image illumination reaching successive reflector surfaces.

According to a further feature of an embodiment of the present invention, the plurality of mutually-parallel reflector surfaces within the LOE further comprises a coupling-in reflector surface that forms at least part of a coupling-in arrangement, the coupling-in reflector surface having high reflectivity for angles of incidence above 60 degrees to the normal and reflectivity of at least about 66% for angles of incidence less than 35 degrees to the normal.

According to a further feature of an embodiment of the present invention, the plurality of reflector surfaces including the coupling-in reflector surface are part of a symmetrical arrangement of two sets of mutually-parallel reflector surfaces including two coupling-in reflector surfaces, the two coupling-in reflector surfaces meeting to form a chevron coupling-in arrangement.

According to a further feature of an embodiment of the present invention, there is also provided an image projector projecting a collimated image, and wherein a coupling-in arrangement optically couples the collimated image into the LOE as first-order image illumination so as to propagate within the LOE by internal reflection at the major faces, the first-order image illumination spanning a first angular field of view, the first angular field of view being at steeper angles to the major surfaces than the reflector surfaces.

According to a further feature of an embodiment of the present invention, at least part of the first-order image illumination propagating along the LOE is transmitted and then reflected by one of the reflector surfaces to generate second-order image illumination spanning a second angular field of view at shallower angles to the major surfaces than the reflector surfaces.

According to a further feature of an embodiment of the present invention, the second-order image illumination is deflected back to first-order image illumination by reflection in a subsequent one of the reflector surfaces.

According to a further feature of an embodiment of the present invention, the reflector surfaces are inclined at an angle of 20°-26°, and preferably at an angle of 23°-25°, to the major external surfaces of the LOE.

For the purpose of defining angles of incidence of a ray incident on a plane, the angle of incidence is defined as the angle between the ray direction and a normal to the plane, such that a ray perpendicular to a surface has an angle of incidence referred to as 0° while an angle approaching 90° is grazing incidence. Unless otherwise specified, the phrase "small angles of incidence" refers to angles of 0°-35° while "large angles of incidence" refers to angles of 60°-90°.

The terms "steep" or "steeper" are used to refer to rays with relatively small angles of incidence to a plane, or to a plane which is inclined at a relatively large angle to the reference plane. Conversely, "shallow" or "shallower" are used to refer to relatively large-angle rays that are nearer to grazing incidence, or to a plane which is inclined at a relatively small angle to the reference plane.

BRIEF DESCRIPTION OF THE DRAWINGS

The invention is herein described, by way of example only, with reference to the accompanying drawings, wherein:

FIGS. 2A, 2C, 2D and 2E are schematic side views of an LOE constructed and operative according to the teachings of an embodiment of the present invention, illustrating various ray paths for rays of an image propagating along the LOE;

FIG. 2B is an enlarged view of the region of FIG. 2A indicated by a circle designated II.

DESCRIPTION OF THE PREFERRED EMBODIMENTS

Figure 1A:
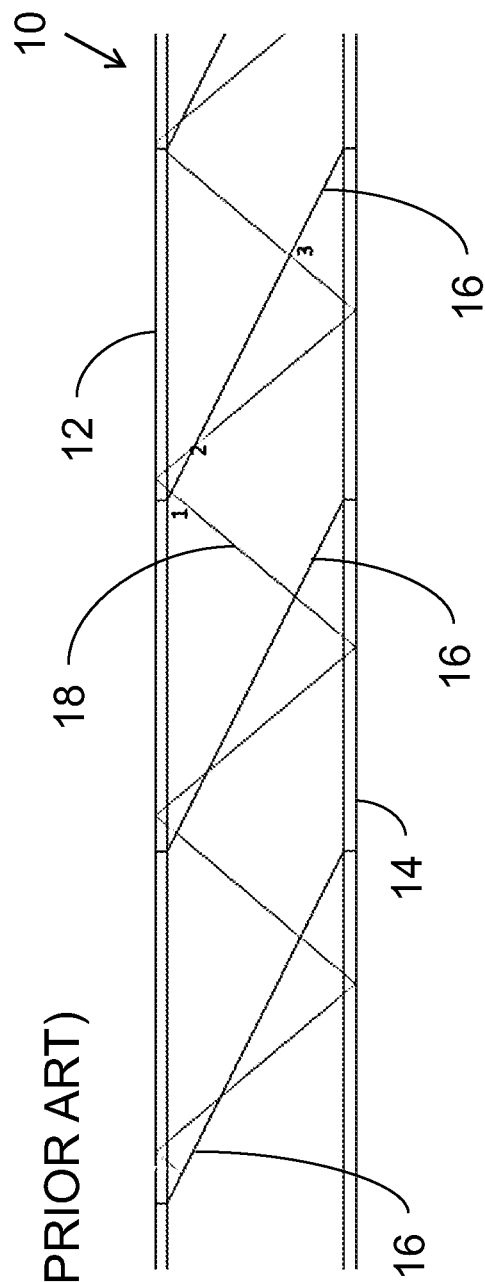
FIGS. 1A and 1B, discussed above, are schematic side views showing the geometry of a ray of light propagating along an LOE and a set of obliquely oriented partially-reflective surfaces within the LOE according to certain conventional LOE designs.
Figure 1B:
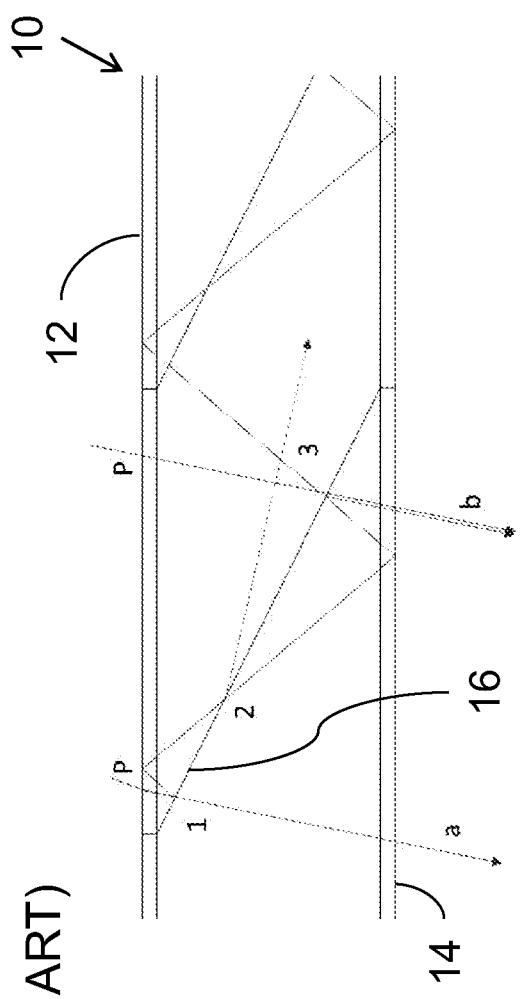

The present invention is an optical system including a light-guide optical element.

The principles and operation of optical systems according to the present invention may be better understood with reference to the drawings and the accompanying description.

Referring now to the drawings, FIGS. 2A-2E are schematic illustrations of a basic implementation of part of an optical system including a light-guide optical element (LOE) 100 having a pair of parallel major external surfaces 102 and 104. A plurality of mutually-parallel reflector surfaces 106a, 106b and 106c are deployed within LOE 100, obliquely angled relative to major external surfaces 102 and 104.

It is a particular feature of certain particularly preferred implementations of the present invention that at least one of the reflector surfaces 106b, 106c is configured to have high reflectivity for angles of incidence above 60 degrees to the normal and partial reflectivity for angles of incidence less than 35 degrees to the normal. "High reflectivity" in this context is generally taken to mean reflectivity above 90%, and more preferably in excess of 95%. In some particularly preferred implementations, the high reflectivity achieved for incident angles above 60 degrees is above 98%, and most preferably close to 100%. Unlike the prior art approaches described above, this aspect of the present invention does not require the reflector surfaces to have near-zero reflectivity at any range of incident angles. This greatly simplifies implementation of the multi-layer dielectric coatings or other reflective coatings applied to the reflector surfaces.

The use of reflector surfaces that are highly reflective at large angles generates distinctive ray paths that differ from those of the prior art. Specifically, referring to the ray paths illustrated in FIGS. 2A and 2C-2E, as well as in the enlargement of FIG. 2B, a collimated image delivered to the LOE (exemplified by injected rays 108 in various different positions across the aperture, labeled A, B, C, D and E) is coupled into the LOE as first-order image illumination, exemplified by image rays 110a and their conjugate image rays 110b so as to propagate within LOE 100 by internal reflection at the major faces 102, 104. The illustrated rays A-E are all parallel which, in a collimated image, indicates that they all correspond to illumination from a single pixel of the injected image, where the total field of view (FOV) of the coupled-in image, referred to here as "first-order image illumination," spans a first angular field of view. This first angular field of view is directed at steeper angles to the major surfaces than the reflector surfaces 106a, 106b, 106c. As a result of this steeper angle of the first angular field of view, at least part of the first-order image illumination propagating along the LOE undergoes reflection at large incident angle by one of the reflector surfaces, deflecting rays 110a to generate second-order image illumination, exemplified by ray 112, spanning a second angular field of view at shallower angles to the major surfaces 102, 104 than the reflector surfaces 106a, 106b, 106c. When ray 112 impinges on the next reflector surface, the second-order image illumination 112 is deflected back to first-order image illumination 110a by reflection in a subsequent one of the reflector surfaces. When rays 110b impinge on the reflector surfaces, this occurs at small angles (less than 35 degrees), resulting in partial reflection for coupling out image illumination as rays 114, as well as partial transmission of rays 110b which carries forward part of the illumination intensity for coupling-out further along the LOE.

In the non-limiting example illustrated here, coupling-in of image rays 108 is achieved using reflector surface 106a which is implemented as a coupling-in reflector surface with high reflectivity for angles of incidence above 60 degrees to the normal and more than 50% reflectivity, typically at least about 66%, for angles of incidence less than 35 degrees to the normal. A first reflection in facet 106a thus couples-in the image illumination to first-order image illumination 110b. Rays A and B illustrated in FIGS. 2A-2C enter in a region of the input aperture and at an angle that leads to them being reflected a second time from facet 106a, resulting in second-order image illumination 112, which is converted back to first-order image illumination 110a at facet 106b. That first-order image illumination then reflects from major surface 104 to become 106a which traverses facet 106b while generating coupled-out rays 114 by partial reflection. Rays A and B continue to propagate along the LOE, also traversing facet 106c where further partial reflection occurs, and then undergo an additional large-angle reflection at facet 106c to repeat the above process. Since the reflectivity of the reflector surfaces at large angles is high, the conversion to and from second-order image illumination occurs without significant losses of energy or generation of ghost images. Additionally, the use of relatively shallow-angle reflector surfaces facilitates implementation of a relatively thin and light-weight LOE. Preferred inclination of the reflector surfaces relative to the major surfaces of the LOE is between 20°-26°, and most preferably 23°-25°.

Figure 2D:
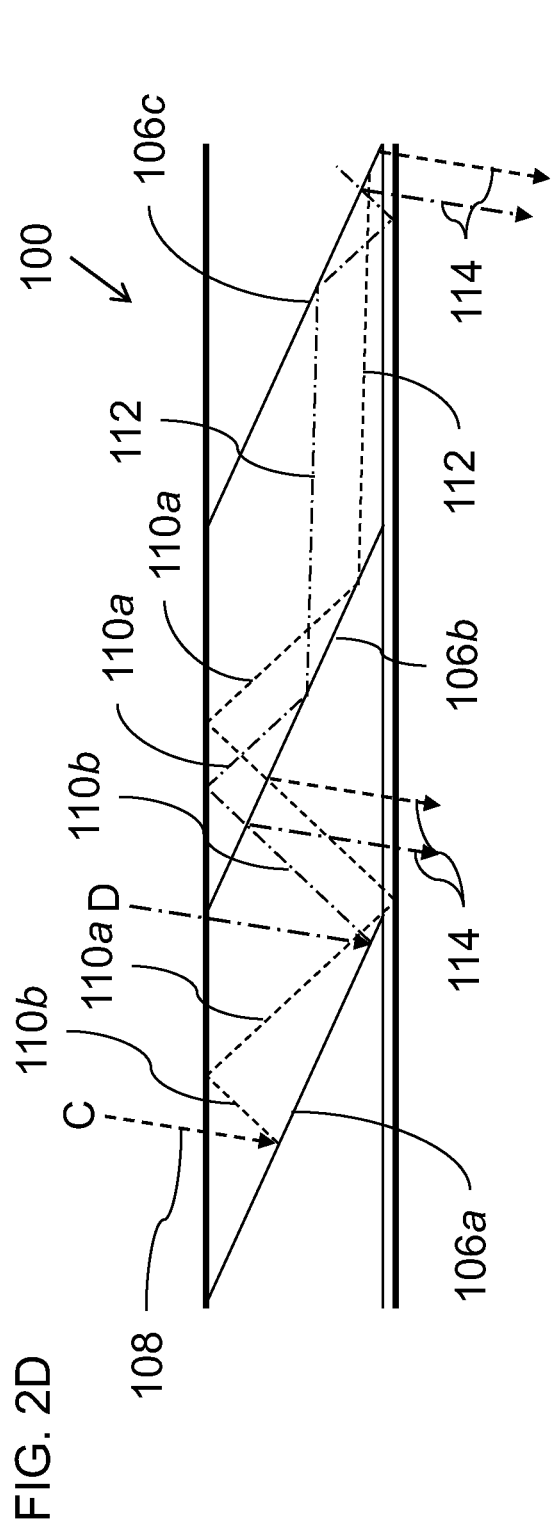
Figure 2E:
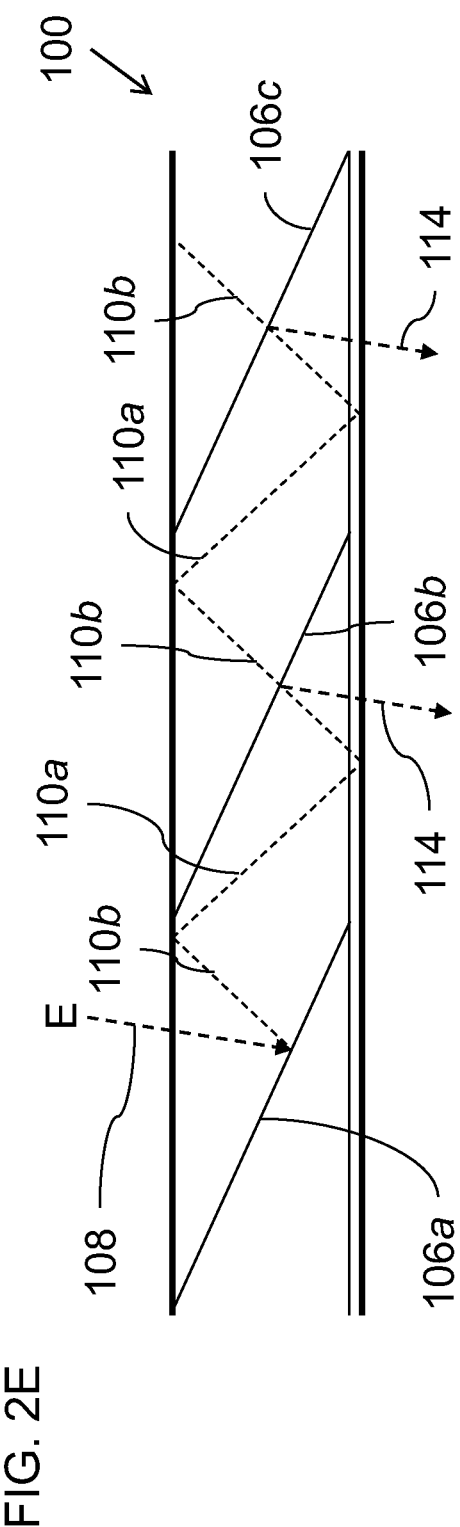

It will be noted that different rays undergo the above conversion between first- and second-order image illumination at different locations, and in some cases, not at all. Thus, FIG. 2D illustrates rays C and D which undergo regular first-order image illumination propagation between facets 106a and 106b, and then undergo conversion to second-order illumination by reflection on the rear face of second reflector surface 106b. FIG. 2E illustrates a ray E for which the position and angle of the coupled-in ray is such that the ray remains as first-order image illumination over the span of the three facets illustrated here.

These various different types of optical paths provide coupling out of the image illumination from the LOE in a range of locations along the LOE, and typically cooperate to generate a generally continuous overall image output over a desired output area. The partial reflectivity of the reflector surfaces at small angles are preferably varied between the surfaces in order to enhance uniformity of the output image, according to the following principles. Firstly, where a first facet 106a is used as a coupling-in surface, the reflectivity for the coupling-in reflector surface is preferably at least 50%, and is most preferably roughly (1−1/n) where n is the number of facets, unless the coupling-in reflector surface is outside the region in which coupling-out is required, in which case a 100% reflector can be used.

The small-angle partial reflectivity of the remaining facets is preferably roughly 1/n where n for each facet is the number of remaining facets at which coupling-out is required, including the current facet. Thus, for example, in the case of a 3 facet implementation as shown, optimal reflectivity values for the facets at small and large angles would be as follows:

| Facet Number | Reflectivity at small angles | Reflectivity at large angles |
| --- | --- | --- |
| 1 | 66% | >98% |
| 2 | 50% | >98% |
| 3 | 100% | >98% | and for a 4 facet implementation would be as follows:

| Facet Number | Reflectivity at small angles | Reflectivity at large angles |
| --- | --- | --- |
| 1 | 75% | >98% |
| 2 | 33% | >98% |
| 3 | 50% | >98% |
| 4 | 100% | >98% |

The above properties can readily be achieved using standard software tools for designing multi-layer coatings and, in fact, can be achieved more uniformly and require fewer coating layers than the aforementioned conventional designs having requirements of non-reflective properties for certain angular ranges.

The above exemplary reflectance values are suitable for implementations in which the LOE is used for a first dimension of optical aperture expansion that serves as the input to another LOE which is opposite the eye, or for virtual reality applications. For applications in which the LOE is deployed opposite the eye for augmented reality applications, the coupling-in facet is deployed outside the field of view (or an alternative coupling-in configuration is used), and a larger number of facets with relatively low reflectivity at small angles is preferred.

Figure 3:
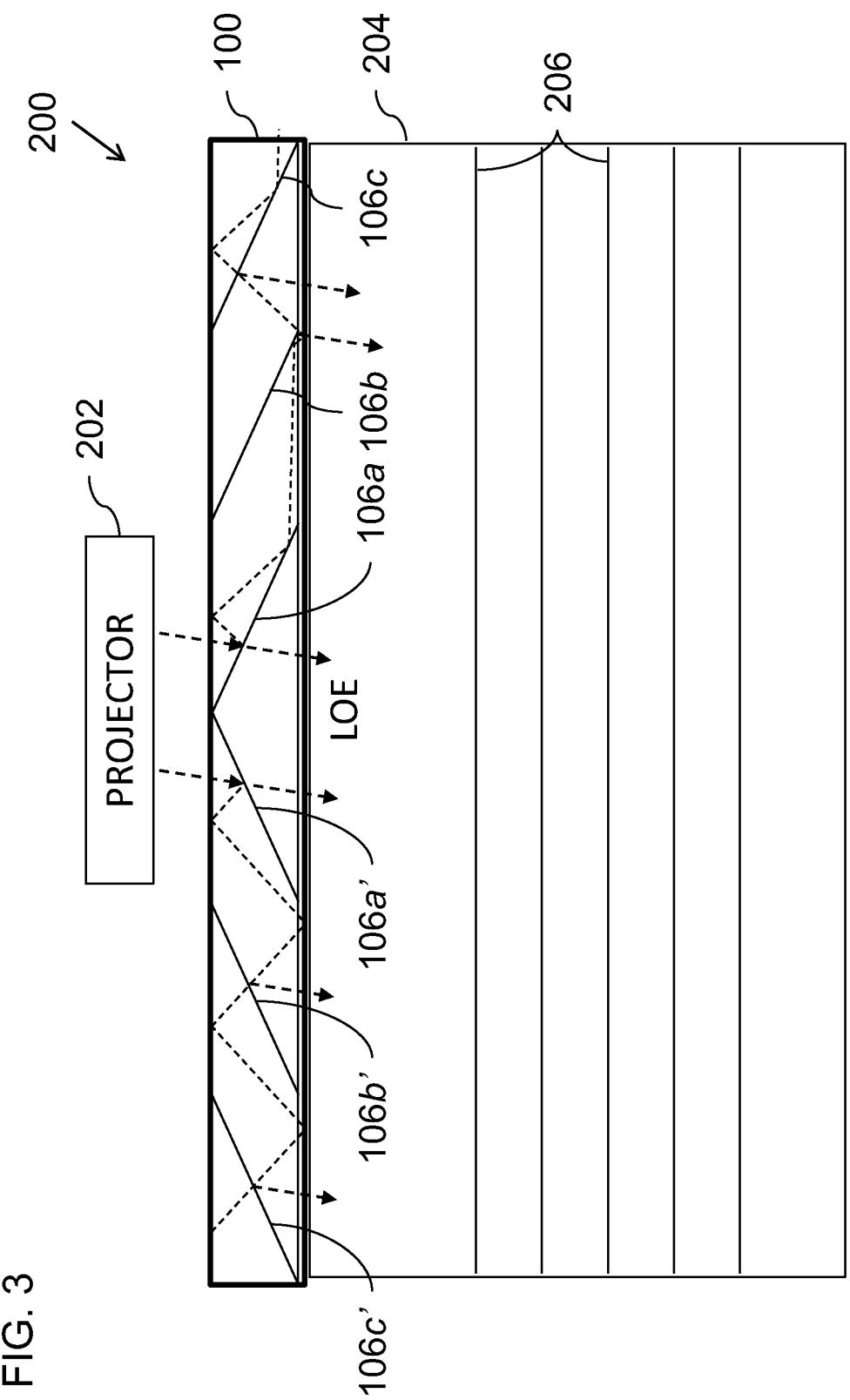
FIG. 3 is a schematic view of an optical system employing the LOE of FIGS. 2A-2E to provide a near-eye display.

FIG. 3 illustrates schematically an overall optical system 200 which includes an image projector 202 configured to project a collimated image. The image projector 202 is shown here only schematically, and can be any type of projector that projects a collimated image. In some embodiments, the image projector includes a light source, a spatial light modulator (such as a liquid crystal on silicon, or "LCOS") and collimating optics. These components may advantageously be arranged on surfaces of a number of beam splitter prisms, for example, polarized beam splitter (PBS) cubes, with reflective collimating optics, all as is known in the art.

A coupling-in arrangement, such as first facets 106a, optically couples the collimated image into the LOE as first-order image illumination so as to propagate within the LOE, with interchange between the first- and second-order image illumination and progressive coupling-out of the image, all as described above. In one particularly preferred but non-limiting implementation as illustrated here, the set of reflector surfaces 106a, 106b and 106c are part of a symmetrical arrangement of two sets of mutually-parallel reflector surfaces 106a, 106b, 106c, 106a', 106b' and 106c' including two coupling-in reflector surfaces 106a and 106a' which meet to form a chevron coupling-in arrangement.

The coupled-out image illumination from LOE 100 is shown here schematically coupled-in to a further LOE 204 which conveys the image opposite the eye of the observer and couples it out towards the observer's eye. LOE 204 may be implemented with facets 206 that are implemented according to the teachings of the present invention, with high reflectivity at large angles, or may be implemented using otherwise conventional LOE technology based on partially-reflective facets and/or diffractive optical elements for coupling-in and coupling-out, as is known in the art.

Although coupling of the projected image into the LOE has been exemplified herein with reference to a coupling-in reflector surface, it will be appreciated that other coupling in arrangements can also be used to advantage. Additional options include, but are not limited to, various forms of coupling-in prism, attached to or integrated with one of the major surfaces and/or with a side surface of the LOE, which provides a correctly angled surface for direct injection of a projected image into a guided first-order image illumination mode, and various coupling-in arrangements based on diffractive optical elements.

Additional features may optionally be implemented in combination with the features described thus far in order to further enhance uniformity of the coupled-out image intensity across the exit aperture. According to one non-limiting example, one or both of the major surfaces of the LOE is modified by addition of a parallel-faced plate optically bonded to the LOE, and with a partially-reflecting interface between the LOE and the plate, generated either by introduction of an interface layer of suitable material or by applying suitable coatings to one or both surfaces at the interface. This partially-reflecting interface serves as a "mixer", generating overlap of multiple optical paths, thereby enhancing uniformity of the coupled-out image intensity across the exit aperture of the LOE.

It will be appreciated that the above descriptions are intended only to serve as examples, and that many other embodiments are possible within the scope of the present invention as defined in the appended claims.

What is claimed is:
1. An optical system comprising:
   (a) a light-guide optical element , LOE, having a pair of parallel major external surfaces and
   a plurality of mutually-parallel reflector surfaces within said LOE said reflector surfaces being obliquely angled relative to said major external surfaces wherein the optical system is characterized in that at least one of said reflector surfaces is configured to have high reflectivity for angles of incidence above 60 degrees to the normal and partial reflectivity for angles of incidence less than 35 degrees to the normal, wherein said high reflectivity is in excess of 95% for angles of incidence above 60 degrees and said partial reflectivity is no more than 50%.

2. The optical system of claim 1, wherein said LOE has a coupling-in region from which coupled-in image illumination propagates along the LOE, and wherein said partial reflectivity varies between successive reflector surfaces so as to at least partially compensate for a decreasing intensity of said image illumination reaching successive reflector surfaces.

3. The optical system of claim 1, wherein said plurality of mutually-parallel reflector surfaces within said LOE further comprises a coupling-in reflector surface that forms at least part of a coupling-in arrangement, said coupling-in reflector surface having high reflectivity for angles of incidence above 60 degrees to the normal and reflectivity of at least about 66% for angles of incidence less than 35 degrees to the normal.

4. The optical system of claim 3, wherein said plurality of reflector surfaces) including said coupling-in reflector surface are part of a symmetrical arrangement of two sets of mutually-parallel reflector surfaces (106a, 106b, 106c, 106a', 106b', 106c') including two coupling-in reflector surfaces (106a, 106a'), said two coupling-in reflector surfaces (106a, 106a') meeting to form a chevron coupling-in arrangement.

5. The optical system of claim 1, further comprising an image projector projecting a collimated image, and wherein a coupling-in arrangement optically couples said collimated image into said LOE as first-order image illumination so as to propagate within said LOE by internal reflection at said major faces, said first-order image illumination spanning a first angular field of view, said first angular field of view being at steeper angles to said major surfaces than said reflector surfaces.

6. The optical system of claim 5, wherein at least part of said first-order image illumination propagating along said LOE (is transmitted and then reflected by one of said reflector surfaces to generate second-order image illumination spanning a second angular field of view at shallower angles to said major surfaces than said reflector surfaces.

7. The optical system of claim 6, wherein said second-order image illumination is deflected back to first-order image illumination by reflection in a subsequent one of said reflector surfaces.

8. The optical system of claim 1, wherein said reflector surfaces are inclined at an angle of 20°-26° to said major external surfaces of said LOE.

9. The optical system of claim 1, wherein said reflector surfaces are inclined at an angle of 23°-25° to said major external surfaces of said LOE.

\* \* \* \* \*